United States Patent [19]  
Dörffel et al.

[11] 4,101,496  
[45] Jul. 18, 1978

[54] HIGHLY PIGMENTABLE, LIQUID COATING COMPOSITIONS

[75] Inventors: Jörg Dörffel, Marl; Werner Andrejewski, Gahlen; Uwe Biethan, Marl, all of Fed. Rep. of Germany

[73] Assignee: Chemische Werke Huls Aktiengesellschaft, Marl, Fed. Rep. of Germany

[21] Appl. No.: 637,017

[22] Filed: Dec. 2, 1975

[30] Foreign Application Priority Data

Dec. 6, 1974 [DE] Fed. Rep. of Germany ....... 2457775

[51] Int. Cl.² ................... C08L 61/24; C08L 61/28; C08L 67/02
[52] U.S. Cl. .................. 260/31.2 R; 260/32.4; 260/32.8 R; 260/33.4 R; 260/33.6 R; 260/33.8 R; 260/39 R; 260/850; 427/372 R; 528/307; 528/281; 528/302
[58] Field of Search .............. 260/850, 67.6 R, 70 R, 260/75 N, 31.2 R, 39 R

[56] References Cited

U.S. PATENT DOCUMENTS

| | | | |
|---|---|---|---|
| 3,553,284 | 1/1971 | Riemhofer et al. | 260/850 |
| 3,678,128 | 7/1972 | Riemhofer et al. | 260/850 |
| 3,691,258 | 9/1972 | Riemhofer et al. | 260/850 |
| 3,819,757 | 6/1974 | Dorffel et al. | 260/850 |
| 3,852,375 | 12/1974 | Biethan et al. | 260/850 |

*Primary Examiner*—John C. Bleutge
*Attorney, Agent, or Firm*—Millen & White

[57] ABSTRACT

Liquid, highly pigmentable coating compositions containing little or no solvent and which are suitable for spray coating employ a binder consisting either of A. 45–10% by weight of an aminoplast, a low-molecular weight precursor thereof, or a mixture thereof, and B. 55–90% of an at least bifunctional polyester, or a mixture thereof, having predominantly hydroxy end groups, a degree of condensation of between 2.5 and 10.5 and a molecular weight of up to 1,000, and prepared by condensing an alcohol component consisting of 0–30 molar percent of one or more 3–6 carbon atom polyols having 3–4 hydroxy groups and 100–70 molar percent of a mixture of diols consisting of 33–90 molar percent of ethylene glycol and 67–10 molar percent of 1,2-propanediol, or a condensation product of A and B.

9 Claims, No Drawings

HIGHLY PIGMENTABLE, LIQUID COATING COMPOSITIONS

BACKGROUND OF THE INVENTION

This invention relates to liquid coating compositions which are capable of being highly pigmented and which contain little or no solvent.

Aminoplasts and/or polyester based coating compositions which are free of or containing low amounts of solvent are known.

German Published Application DAS No. 1,101,667 describes solvent-free aminoplast-based enamels obtained by combining aminoplast solutions with those plasticizers which were conventional at the time the application was filed, and then distilling off the solvent. Plasticizers indicated as especially suitable therein are products containing hydroxyl groups, e.g., castor oil. However, plasticizers which do not contain hydroxy groups are likewise utilized, such as petroleum distillates or conventional phthalate plasticizers. The coatings produced from such coating compositions by baking have poor solvent resistance and a low stability with respect to chemicals. They adhere poorly to metals and have unsatisfactory mechanical properties.

It is also known from German Pat. No. 1,231,833 that coating compositions which are cured at room temperature can be produced from the above-described coating compositions of DAS No. 1,101,667 by the addition of curing agents. An improvement in the coating properties is not attained thereby.

Aminoplasts are known from German Unexamined Laid-Open Application DOS No. 1,595,857 which can be used per se in a solvent-free form, but the coatings produced therefrom are hard, very brittle and inelastic. Combinations of these special aminoplasts with conventional varnish resins are said to be capable of processing in solvent-free form. However, such mixtures have a very high viscosity and therefore can be applied only with great difficulties. Moreover, they lead to coatings which are no better than those of conventional raw materials.

DOS No. 1,644,848 describes a solvent-free coating agent consisting of a reaction product of (a) an etherified aminotriazine/formaldehyde condensation product with a cyclic carboxylic acid, and (b) a fatty-acid-free polyester containing hydroxyl group and having an OH-constant of more than 4%. The coatings produced in accordance with the example set forth in this application (Comparative Example A) are transparent and show good mechanical properties. If the binders are used in pigmented coatings, the film properties of the coatings are markedly impaired.

The binders described in U.S. Pat. No. 3,852,375 of Biethan et al. issued Dec. 3, 1974 made up of aminoplasts and ester mixtures produce high quality, transparent coatings after a solvent-free or low-solvent application. The good mechanical properties are decreased in case of high degrees of pigmentation and then no longer meet absolutely the practical requirements. The coatings also tend to run off vertical surfaces during the baking step. This patent does not disclose the fact that if hexahydroterephthalic acid is utilized in predominant quantities in forming the polyester component, excellent coating compositions are formed which can be pigmented to a high degree.

U.S. Pat. No. 3,553,284 of Riemhofer et al. issued Jan. 1, 1971 describes solvent-containing coating compositions formed from polyesters which contain hydroxyl and carboxyl groups, and polymers and/or oligomers which contain N-methylol groups and/or N-methylol ether groups. The diol component of these polyesters consists of 80-100 mol-% of either ethylene glycol or of 1,2-propanediol and 0-20 mol-% of other diols. Hexahydroterephthalic acid is primarily employed as the acid component plus up to 20 mol-% of other dicarboxylic acids. Due to the tendency toward crystallization exhibited by the polyethylene hexahydroterephthalates, as well as due to the unsatisfactory mechanical properties of the coatings of low-molecular polypropylene hexahydroterephthalates at a high degree of pigmentation, the coating compositions of the aforementioned reference are unsuitable for the production of high-quality, solvent-free and/or low-solvent coating compositions. The reference does not disclose that the coating compositions described therein can also be processed in a solvent-free or substantially solvent-free condition.

German Application No. P 23 43 436 described liquid coating compositions formed up of binders and small proportions of organic solvents, as well as optionally also on a solvent-free basis, which contain as the binders mixtures of aminoplasts and polyesters. This application does not disclose that hexahydroterephthalic acid must be used in a predominant proportion in the acid component.

For examples of prior art polyesters and aminoplasts useful for forming coating compositions, see, e.g., U.S. Pat. Nos. 3,668,275, 3,668,276, 3,668,277, 3,678,128, 3,691,258, 3,770,668, and the references cited therein, whose disclosures are incorporated by reference.

It is an object of the present invention to provide solvent-free or low-solvent coating compositions which, in addition to having good general characteristics, such as excellent hardness in combination with good elasticity, are highly pigmentable and have coating and curing characteristics such that vertical surface areas can be coated therewith without the coating composition being nonuniformly distributed over the entire surface area due to gravity. Other objects will be apparent to those skilled in the art.

SUMMARY OF THE INVENTION

The coating compositions of this invention contain, along with optional conventional auxiliary agents, as binder A. 45-10% by weight of an aminoplast and/or a low-molecular precursor thereof, and B. 55-90% by weight of an at least bifunctional polyester or mixture of polyesters having predominantly free hydroxyl end groups and optionally free carboxyl end groups, prepared by condensing a component I consisting of I.1 0-30 molar percent of one or more aliphatic polyols with 3 or 4 hydroxyl groups and 3-6 carbon atoms and I.2 100-70 molar percent of a mixture II of ethylene glycol and 1,2-propanediol, with a component III consisting, in addition to conventional aromatic and/or (cyclo-) aliphatic acids, predominantly of hexahydroterephthalic acid; or contain as binder a co-condensate of an aminoplast and/or a low-molecular precursor thereof or the starting materials for production of the aminoplast, with the polyester.

These binders are characterized by (i) the polyesters and/or polyester mixtures employed as component B having a degree of condensation of between 2.5 and 10.5 and an average molecular weight not higher than 1000;

(ii) the mixture II consisting of
II.1 33–90 mol-% of ethylene glycol and
II.2 67–10 mol-% of 1,2-propanediol; and (iii) component III containing at least 80 mol-% of hexahydroterephthalic acid and/or derivatives thereof.

The coating compositions of this invention contain 0–25%, preferably 0–15%, by weight of solvent.

The term "average molecular weight" as used herein means the numerical mean of the molecular weights of the polyesters or polyester mixtures employed, which can be determined, for example, by end group titration.

Examples of suitable polyols are glycerin, trimethylolethane, trimethylolpropane, and pentaerythritol, with glycerin and trimethylolpropane being preferred.

In component II, while maintaining the molar ratios of components II.1 to II.2, up to 30 mol-% of the total quantity can be replaced by one or more other aliphatic or cycloaliphatic diols, whose hydroxyl groups are separated by 2–8 carbon atoms and wherein optionally up to 2 of the carbon atoms in the chain can be replaced by oxygen atoms which, in turn, are separated by at least 2 carbon atoms from each other and from the hydroxyl groups.

Examples of such diols are 1,3-propanediol, 1,2-butanediol, 2,3-butanediol, 1,3-butanediol, 1,4-butanediol, 2,2-dimethyl-1,3-propanediol, 1,6-hexanediol, 1,4-bis(hydroxymethyl)-cyclohexane, $x,8$-bis(-hydroxymethyl)tricyclo[5,2,1,0$^{2,6}$]-decane, wherein $x$ stands for 3,4, or 5, diethylene glycol or dipropylene glycol. Cycloaliphatic diols can be utilized in their cis- or trans-form or as a mixture of both forms.

The diol component consists 70–100% of a mixture of 33–90 mol-% of ethylene glycol and 67–10 mol-% of 1,2-propanediol. Preferred ratios are 66.7–90 mol-% of ethylene glycol and 33.3–10 mol-% of 1,2-propanediol. The inherent viscosity of the polyesters employed in the coating compositions of this invention can be increased by the concomitant use in the alcohol component of polyols having more than two hydroxyl groups. The viscosity of the polyester can also be regulated by the optionally concomitantly employed diols, i.e., the use of longer-chain linear diols lowers the viscosity whereas branched or cycloaliphatic diols effect an increase in viscosity.

In addition to hexahydroterephthalic acid, it is also possible to employ derivatives thereof which are known to be suitable for esterification with diols to form polyesters. The dimethyl ester of a cis-, trans-isomer as obtained during the high-pressure hydrogenation of dimethyl terephthalate, is preferred.

Up to 20% by weight of the hexahydroterephthalic acid can be replaced by one or more other aliphatic, cycloaliphatic, or aromatic dicarboxylic acids, whose carboxyl groups are in the 1,2- or 1,3-position with respect to each other. Examples of suitable acids are phthalic acid, isophthalic acid, tetrahydro- and hexahydro-phthalic and- isophthalic acid, as well as endomethylene- or endoethylenetetrahydrophthalic acid, hexachloroendomethylene-tetrahydrophthalic acid, or tetrabromophthalic acid, wherein the cycloaliphatic dicarboxylic acids can be used in their trans- or cis-form or as a mixture of both forms. Isophthalic acid and especially phthalic acid are preferred.

Especially suitable as saturated aliphatic dicarboxylic acids are succinic acid, glutaric acid, adipic acid, suberic acid, sebacic acid, azelaic acid, decanedicarboxylic acid, 2,2,4- or 2,4,4-trimethyladipic acid. Saturated aliphatic dicarboxylic acids of 4–6 carbon atoms, especially adipic acid, are preferred.

In place of the hexahydroterephthalic acid and the other free dicarboxylic acids, it is also possible to employ the esters thereof with short-chain alkanols, e.g., the dimethyl, diethyl and dipropyl esters. Insofar as the dicarboxylic acids form anhydrides, these can also be used, e.g., phthalic ahydride, hexahydrophtalic anhydride, tetrahydrophthalic anhydride, succinic anhydride and glutaric anhydride.

The preparation of the esters can be conducted according to any conventional and customary method, i.e., with or without a catalyst, with or without conducting an inert gas stream through the reaction mixture, and by solvent condensation, melt condensation, or azeotropic esterification at temperatures of up to 250° C., optionally also at higher temperatures with the thus-liberated water or the thus-liberated alkanols being removed. The esterification can be followed by determining the hydroxyl and acid numbers. Normally, the esterification conditions are selected so that the reaction is as complete as possible, i.e., so that the acid number, in ester batches made up of $n$ moles of diol, $m$ moles of polyol, and ($n + m - 1$) moles of dicarboxylic acid, is less than 10 mg. KOH/g. The molecular weight of the esters can be regulated by the ratio of alcohol component (diol and optionally polyol) to dicarboxylic acid. Of course, it is also possible to employ suitable polyesters having higher acid numbers, but care must be taken in such a case that the condensation is terminated in time, i.e., before the molecular weight exceeds 1,000.

If a portion of the acid component is utilized in the form of the free acid and/or anhydride and the other part as an alkyl ester, it is advantageous to conduct the reaction in two successive stages. In this method, the alkyl ester is transesterified, in the first stage, with a portion or with the entire amount of the diols and/or polyols necessary for the preparation of the esters, until the alkanol is almost entirely removed. Subsequently, the remaining components are added, and the condensation is carried out, while splitting off water, until the desired degree of conversion has been achieved.

The esterification temperature is selected so that the losses of readily volatile substances which form the esters of this invention are small, i.e., at least during the first interval of the esterification, the reaction is carried out at a temperature below the boiling point of the lowest-boiling starting material.

Solvent-free and/or low-solvent coating compositions yielding, even with high pigmentation, coatings having satisfactory properties can be obtained with the use of esters or ester mixtures having an average degree of polymerization of at least 2.5 to 10.5. The average molecular weight thereof is not higher than 1000, i.e., from about 200 to 1000. Because of their lower viscosity, those esters are especially preferred which have a molecular weight of less than 800, e.g., 300–800. The latter form coating compositions with particularly good processability.

The characteristics of the coatings prepared from the esters to be used according to this invention are dependent on the average molecular weight, on the functionality, and on the composition of the polyesters. With polyesters of higher average molecular weights, the flexibility of the cured varnish film is reduced and hardness is increased.

Differences in the composition of the polyester have a similar effect. With the concomitant use of aromatic and cycloaliphatic dicarboxylic acids to form the polyesters, the elasticity of the varnish film is reduced while its hardness is increased. The concomitant use of aromatic and aliphatic dicarboxylic acids lowers the hardness and increases the elasticity. With increasing chain-length this effect becomes greater.

An analogous influence is exerted by the diols, i.e., with an increasing chain length of the open-chain diols which optionally are employed and with an increasing proportion of these diols in the polyester, the varnish film become softer and more flexible. However, if, in the production of the esters, such optional diols are employed which have short and branched carbon chains or cycloaliphatic rings, the resultant coating compositions normally form harder and less elastic films with an increasing proportion of these diols.

The molar ratio of polyol to diol also is of significance for the mechanical properties of the varnish films, i.e., with a decreasing molar ratio of polyol or diol, the hardness of the films is reduced and their elasticity becomes greater. Conversely, with increasing molar ratios of polyol to diol, the flexibility of the varnish films is reduced and the hardness is improved. Knowing these effects, one skilled in the art is readily capable of selecting, within the framework of the claimed ranged, polyesters having optimum properties for the respective purpose for which the coating compositions of this invention are to be utilized.

Examples of suitable aminoplasts are the conventional reaction products of aldehydes, especially formaldehyde, with compounds bearing several amino or amido groups, such as, for example, melamine, urea, dicyandiamide and benzoguanamine. Mixtures of such products are also suitable. Especially suitable are the aminoplasts modified with alcohols, e.g., methanol or ethanol.

Due to their low bulk viscosity, the low-molecular, structurally defined aminoplast are preferably employed which are miscible with the polyesters to be used to form the coating compositions of this invention to a practically unlimited extent. Examples of such structurally defined aminoplasts are dimethylolurea, tetramethylolbenzoguanamine, trimethylolmelamine and hexamethylolmelamine. The latter can also be used in a partially or completely etherified form, such as, for example, dimethoxymethylurea, tetrakis(methoxymethyl)benzoguanamine, tetrakis(ethoxymethyl)benzoguanamine. Also suitable are partial or complete etherification products of hexamethylolmelamine, such as tetrakis(methoxymethyl)bis-methylolmelamine pentakis(methoxymethyl)monomethylolmelamine and hexakis(methoxymethyl)melamine, as well as mixtures of these three compounds, or hexakis(butoxymethyl)melamine. Especially preferred are hexamethylolmelamine derivatives etherified with alcohols of 1–4 carbon atoms and which are liquid at room temperature.

The polyesters employed in the coating compositions of this invention can also be combined with high-molecular weight, preliminarily condensed aminoplasts. Normally, the polyesters of this invention can be mixed with such aminoplast resins in the claimed mixing ratios without the appearance of turbidity. However, if the mixtures of resinous aminoplasts with the polyesters of this invention result in turbidity, the compatibility can be improved by reacting the polyesters and aminoplasts in a conventional manner in bulk or in solution with each other with care being taken that the reaction does not proceed to cross-linking. This can be affected, for example, by heating the mixture or a solution of the two resins for a short time, optionally in the presence of a catalyst, such as, for example, an organic or mineral acid. Thus, the binders of this invention include such pre-reaction products with a polyester as defined hereinabove.

It is also possible to add the polyesters to be used in the coating compositions of this invention before or during the preparation of the aminoplast resins from, for example, urea, benzoguanamine or melamine and aldehydes. It is, of course, also possible to employ additionally the conventional alkanols employed for the modification of the thus-formed aminoplast resin. The methods for the preparation of such amine/aldehyde resins are conventional. A large number of commercially available aminoplasts are available for combining with the polyesters to be used in the coating compositions of this invention.

To produce the coating compositions, the polyester and the aminoplast or the aminoplast solution are normally first mixed together. The weight ratio of polyester to aminoplast can vary from 55 : 45 to 90 : 10, preferably from 65 : 35 to 85 : 15. The optimum weight ratio of these two components for the intended end-use of the coating compositions can readily be determined by preliminary experiments.

In this regard, it should be taken into account that frequently the hardness of the cured coatings is increased and their elasticity reduced by increasing the aminoplast proportion, whereas when the aminoplast proportion is decreased, the hardness of the coating diminishes and its flexibility increases.

In correspondence with the desired end-use for which the coating composition is intended, the viscosity thereof can be lowered by adding minor amounts, i.e., up to 25% by weight of the final coating composition, of conventional varnish solvents, such as, for example, propanol, isopropanol, butanol, ethyl acetate, butyl acetate, ethyl glycol, ethyl glycol acetate, butyl glycol, methyl ethyl ketone, methyl isobutyl ketone, cyclohexanone, 2-nitropropane, trichloroethylene, or mixtures thereof. It is also possible and optionally to be recommended for economical reasons to employ additionally more or less large proportions of less polar slvents, e.g., xylene, higher-boiling aromatic cuts, or aliphatic hydrocarbon mixtures, such as, for example, mineral spirits. The proportional quantity of these less polar solvents which is added can be selected arbitrarily within the scope of the solubility of the polyesters used according to the invention and the compatibility thereof with the aminoplasts utilized. Frequently, the proportion thereof can reach more than 80% in the solvent mixture. Insofar as the coating compositions are compatible with water due to their polarity, it is also possible to employ water as the solvent.

When using commercial aminoplast solutions, their solvent content is normally entirely adequate to process the mixture of polyester and aminoplast solution without any addition of further solvent. The amount of aminoplast solution and its dilution is dimensioned, within the scope of this invention, so that solvent content of the final, ready-for-use coating composition does not exceed 25% by weight. If larger quantities of solvent are present, e.g., resulting from the use of a highly diluted aminoplast solution, a portion of the aminoplast solvent can thereafter be removed from the coating mixture.

When using the preferred liquid aminoplasts and the polyesters of this invention, additional solvent is ordinarily superfluous, since the coating compositions, especially those produced from very low-molecular polyesters, exhibit a viscosity sufficiently low for their application without any additional solvent.

The viscosity of the coating compositions should be, at room temperature, no higher than 500 poises, preferably not above 100 poises, since otherwise undesirable bubble formation may occur during the baking step of the coatings.

The coating compositions of this invention can contain, in addition to larger amounts of pigment, than can normally be employed, the usual additives and auxiliary agents, especially flow agents and furthermore other binders, such as, for example, epoxy resins, and silicone resins which contain hydroxyl groups.

The binder/pigment ratio is determined by the purpose for which the coating composition is to be used. Thus, the binders are pigmented in a weight ratio of 1 : 0.3 to 1 : 0.8 if they are to be used for the production of car paint top coats or industrial varnishes. Even at a binder/pigment weight ratio of 1 : 1.1 to 1 : 1.3, which is conventional in the coating of packaging items or during coil coating, the coatings show extraordinarily good properties nonexistent in the previously known, solvent-free or low-solvent systems of this type. The coating compositions of this invention can contain even higher pigment contents, for example, in the manufacture of primer coats, e.g., with a binder/pigment-weight ratio of 1:2.

The preferred coating compositions of this invention comprise besides pigments and auxiliary agents any or all of the following:

I. Solvent: 0 – 15%
II. Binder: 100 – 85%
   A. Aminoplast: hexamethylolmelamines, which are partially or completely etherified with $C_1$ to $C_4$ alkanols, or melamine-formaldehyde-alkanol condensate
   B. Polyester: Acid number: less than 10 mg. KOH/g; Average molecular weight: 300 to 800.
     1. Alcohol Component
       a. 100–70, preferably 100–80, mol-% of ethylene glycol (66.7–90 mol-%) and propyleneglycol (33.3–10 mol-%);
       b. 0–30, preferably 0–20, mol-% of another diol or polyol;
     2. Acid Component
       a. 100–90 mol-% of dimethyl hexahydroterephthalate;
       b. 0–10 mol-% of another dibasic acid or derivative thereof, preferably either or both of phthalic anhydride and adipic acid;
     3. Molar Ratio of Alcohol Component to Acid Component: $n$ moles of diol, $m$ moles of polyol and about $(n + m - 1)$ moles of acid component.
III. Weight Ratio of Polyester Component to Aminoplast Component: 65 : 35 to 85 : 15.

The thus-obtained coating composition can be applied by conventional methods, for example, by spreading, spraying, dipping, or rolling, while cold, warm or hot, and baked, e.g., at temperatures of from 100° to 250° C. The cross-linking reactions occurring during this process are catalytically accelerated by acids. Thus acidic substances can be added to the coating composition when using polyesters having a very low acid number to accelerate curing. For example, 0.5% by weight of p-toluenesulfonic acid (based on the total binder) greatly accelerates the cross-linking reaction.

The coatings produced in accordance with the coating compositions of this invention have a multitude of good properties. They have a high gloss, are readily pigmentable, exhibit excellent resistance against yellowing, are stable under baking conditions, and exhibit high adhesion, especially to metals. In salt spray tests, tropical weathering tests, and tests in the Weather-Ometer, the cured coatings exhibit an excellent corrosion-protection effect and weathering stability.

An outstanding characteristic of the coatings produced in accordance with this invention is the lack of, or an extremely minor, runoff tendency of the uncured coating on vertically disposed surfaces during application and baking. This property makes it possible to process the coating compositions of this invention extensively without thixotroping agents, which is especially advantageous, especially since the addition of large amounts of thixotropy-producing substances results in other disadvantages, such as, for example, a higher viscosity, poorer flow properties, a decrease in luster, etc.

Conventional coating compositions having a high proportion of a solvent exhibit, on vertical surfaces, no runoff tendency or only a minor runoff tendency of the freshly applied coat, after part of the solvent has been evaporated. However, due to their high content of organic solvents, such systems have the disadvantage of liberating during baking considerable quantities of organic solvents which is disadvantageous from a physiological viewpoint. Because of the presently existing environmental protection regulations, it is thus necessary to process such coating composition systems in expensive plants. The thus-liberated solvents are removed from the exhaust air, for example, by afterburning.

Conventional aminoplast and polyester coating compositions which are free of solvent or have a low solvent content do not exhibit this disadvantage but, due to their viscosity characteristics, they cannot be applied to vertical surfaces and baked thereon without runoff phenomena. Moreover, they cannot be pigmented to a sufficiently high degree.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. The quantitative data, unless indicated otherwise, all are on a weight basis.

EXAMPLES

Ester Production

A. Polyesters with Hexahydroterephthalic Acid Units as the Only Dicarboxylic Acid Building Block A mixture of 124 g. of ethylene glycol (2 moles), 76 g. of 1,2-propanediol (1 mole), and 400 g. of dimethyl hexahydroterephthalate (2 moles) is heated, after adding 0.4 ml. of a 10% by volume isopropanol solution of titanium tetraisopropylate, for 2–3 hours to 180°–190° C. under agitation, a gentle nitrogen stream, and constantly distilling off the thus-formed methanol. The temperature is then gradually raised to 215° C. After a total of 25 hours, almost 128 g. of methanol have been split off. The clear, colorless ester mixture has an acid number of 1.4 mg. KOH/g. and a hydroxyl number of 219 mg. KOH/g, corresponding to an average molecular weight of 507.

B. Concomitant Use of Other Dicarboxlic Acids 155 g. of ethylene glycol (2.5 moles), 38 g. of 1,2-propanediol (0.5 mole), 360 g. of dimethyl hexahydroterephthalate (1.8 moles) are reacted almost quantitatively, after adding 0.36 ml. of a 10% by volume isopropanol solution of titanium tetraisopropylate, as described under (A). After the mixture has been cooled off, 29.2 g. of adipic acid (0.2 mole) is added thereto, and a condensation is conducted for about 15 hours at 200° C. while passing a small nitrogen stream through the mixture, thus liberating about 7 ml. of water. The thus-obtained, clear ester mixture has an acid number of 4.7 mg. KOH/g. and a hydroxyl number of 250 mg. KOH/g., corresponding to an average molecular weight of 457.

Production of a Binder

The ester mixture is combined with a commercial hexamethylolmelamine derivative or a solution of a melamine-formaldehyde-alkanol condensate in the desired solids ratio. If the ester and the aminoplast are incompatible, the mixture of the two components, which contains a solvent when using aminoplast solutions, is heated for 10–60 minutes to 50°–100° C.

Preparation of a Coating Composition

To produce a coating composition, a pigmentation step is carried out, optionally after adding solvent, in the desired binder/pigment ratio by incorporating the corresponding quantity of pigment, for example, in a three-roller mill.

Preparation and Testing of the Coatings

For test purposes, the coating composition is applied at room temperature to test metal sheets and glass panes and baked. To lower the baking temperature, 0.5% p-toluenesulfonic acid (based on the total binder) is added. The layer thickness of the films on which the test is conducted is 30–40 μ. The hardness test is in accordance with DIN 53 157 by determining the pendulum hardness according to König. The elastic behavior of the coatings is determined by the Erichsen back-impact test (according to DIN 53 156). As a measure of the elasticity, the depression of the coated sheet metal is indicated in millimeters at which the coat begins to rupture. An essential aspect for this testing method is the gradual deformation of the coating (advancement: 0.2 mm./sec.).

The impact elasticity given in Table 1, which is a measure of the behavior of the coatings at a suddenly occurring deformation, is determined by means of the impact depression device 226/D by the firm Erichsen, Hemer-Sundwig. In this device, a hemisphere having a radius of 10 mm. is suddently pressed into the metal sheet from the backside of the varnish coat by means of a falling weight. By varying the falling height of the weight, the depression can be varied. The depression value is indicated (in mm.) at which the varnish layer begins to tear. The values set forth in the examples were obtained in this manner. In one example, the value is indicated to be >5 mm., since the aforedescribed device does not make a larger depression possible with the deep-drawn sheets of a thickness of 1 mm. normally utilized for testing purposes.

Examples denoted by letters are comparative examples.

EXAMPLE A (According to DOS No. 1,644,848)

Using zinc octoate and lithium naphthenate as catalysts, a polyester is prepared from a mixture of 156.4 g. of glycerin (1.7 moles), 60.8 g. of 1,2-propanediol (0.8 mole), 109.5 g. of adipic acid (0.75 mole), and 111 g. of phthalic anhydride (0.75 mole) by adding xylene under azeotropic conditions at temperatures of 150°–170° C. The condensation was terminated afer reaching an acid number of 12.5 mg. KOH/g. The thus-formed product has a hydroxyl number of 490 and, in a 75% ethanolic solution, a viscosity of 86 sec. in a DIN 4 mm. beaker at 20° C.

Forty parts of this polyester, which is free of fatty acid and contains hydroxyl groups, is combined with 60 parts of a reaction product of 100 parts of hexakis(methoxymethyl)melamine and 16 parts of phthalic anhydride, obtained by reaction under vacuum at 100° C. up to an acid number of 9.3 mg. KOH/g., and baked for 30 minutes at 130° C. after adding 10 parts of a solvent mixture of xylene and n-butanol as clear varnish and as a pigmented varnish (100 parts of binder and 50 parts of $TiO_2$). The coatings show the following characterisitics:

| | Pendulum Hardness (sec.) | Elasticity (mm.) | Impact Elasticity (mm.) |
|---|---|---|---|
| Transparent Coating | 193 | 7.5 | 3 – 4 |
| Pigmented Coating | 175 | 2.9 | 1 – 2 |

EXAMPLES B – D (DAS No. 2,019,282)

The polyester mixtures utilized in Tables 1 and 2 in the Comparative Examples B – D are prepared according to DAS No. 2,019,282.

The preparation of the coating compositions and the coatings is accomplished in the manner described above. The aminoplast employed is a commercially available hexamethylolmelamine derivative which is liquid at room temperature. This compound is used in a weight ratio of polyester : aminoplast of 7 : 3. The binders are combined with 0.5% by weight of p-toluenesulfonic acid as the catalyst. Table 1 shows the coating characteristics obtained at varying degrees of pigmentation at 150° C./30 minutes. The coating compositions compared in Table 2 with regard to their runoff tendency are pigmented in a binder : pigment ratio of 1 : 0.7 with titanium dioxide. By adding butyl acetate to the respective pigment pastes, the viscosity of the varnish is adjusted to 40 seconds (4 mm. beaker/20° C.; spray viscosity). Thereafter, metal sheets (coating area 6 × 18 cm.) are coated therewith and, after a venting time of 10 minutes, are baked while vertically suspended for 30 minutes at 150° C. Under the sheet-metal panels, small aluminum dishes are attached to collect any coating composition which has dripped off the panels. During the determination, the amount run into the aluminum dishes is weighed and correlated to the total quantity applied; if a bead has formed along the lower edge of the sheet, this bead is removed and likewise considered as a run-off coating composition.

EXAMPLE E (DOS NO. 1,644,766)

Three moles of 1,2-propanediol and two moles of dimethyl hexahydroterephthalate are reacted as described under (A). Table 1 represents the properties of films from this polyester and a commercial, methyl-etherified hexamethylolmelamine, which is a liquid, in a weight ratio of 7 : 3 with varying degrees of pigmentation.

EXAMPLE F (DOS NO 1,644,766)

Three moles of ethylene glycol and two moles of dimethyl hexahydroterephthalate are reacted as described in (A). The thus-obtained reaction mixture forms, after cooling to room temperature, a highly viscous crystal slurry within a few days and accordingly is unsuitable for the preparation of a solvent-free coating composition. Also, the described polyester is useless for a low-solvent application, inasmuch as 70–80% solutions of the resin in conventional varnish solvents, such as xylene, isopropanol, n-butanol, ethyl glycol, etc. show clouding (turbidity) and later on the formation of a bottom sediment.

TABLE 1

| Example No. | Polyester of (moles) | Average Polyester Molecular Weight | Weight Ratio Polyester : Aminoplast : TiO$_2$ | Solvent Content in Coating Composition (% by Wt.) | Hardness Acc. to DIN 53157 (seconds) | Elasticity Acc. to DIN 53156 Cmm.) | Impact Depression (mm.) |
|---|---|---|---|---|---|---|---|
| B | 2.5 EG* 0.5 PG* 1.4 PA* 0.6 AdA* | 480 | 7:3:0 7:3:5 7:3:7.5 7:3:10 | 10 15 15 15 | 178 182 191 180 | 7.9 5.6 4.5 2.0 | 4–5 2 2 1 |
| E | 3 PG 2 DMHT* | 495 | 7:3:0 7:3:0.25 7:3:0.5 7:3:0.75 7:3:1.25 | 20 16 13.3 11.4 8.9 | 196 214 202 186 160 | 7.4 5.6 5.1 4.8 3.9 | 3 3 1 1 1 |
| 3 | 2.5 EG 0.5 PG 2 DMHT | 493 | 7:3:0 7:3:5 7:3:7.5 7:3:10 | 10 15 15 15 | 208 201 185 179 | 6.8 6.3 5.3 5.1 | >5 5 4–5 4 |

TABLE 2:

| | Runoff Tendency During Baking on Vertical Surfaces | | | | |
|---|---|---|---|---|---|
| Example No. | Polyester of (moles) | Average Polyester Molecular Weight | Viscosity of Polyester (cp. at 20° C.) | Solids Content of the Enamel (%) | Amount of Run-Off Varnish(**) (% of the Entire Baked-In Enamel) |
| B | 2.5 EG 0.5 PG 1.4 PA 0.6 AdA | 480 | 53,000 | 82.3 | 2.5 % |
| C | 1 EG 1 PG 0.5 PA 0.5 AdA | 255 | 1,200 | 89.7 | 7% |
| D | 2.5 EG 0.5 PG 1 PA 1 AdA | 475 | 10,500 | 84.4 | 4% |
| 3 | 2.5 EG 0.5 PG 2 DMHT | 493 | 42,000 | 82.7 | 0% |

(**) The determination of the dripped-off quantity of coating composition takes place according to the description in Comparative Examples B through D.

TABLE 3

| Example No. | Polyester of (moles) | Average Polyester Molecular Weight | Weight Ratio Polyester : Aminoplast : TiO$_2$ | Solvent Content in Enamel (% by Wt.) | Baking Conditions (° C./min.) | Hardness Acc. to DIN 53157 (sec.) | Elasticity Acc. to DIN 53156 (mm.) |
|---|---|---|---|---|---|---|---|
| 1 | 1.6 EG 0.4 PG 1 DMHT | 288 | 8:2:5 | 0 | 130/30 | 160 | 6.7 |
| 2 | 2 EG 0.5 PG 1.5 DMHT | 384 | 8:2:5 | 3.2 | 130/30 | 155 | 7.3 |
| 3 | 2.5 EG 0.5 PG 2 DMHT | 493 | 7:3:0 7.5:2.5:0 7.5:2.5:0 8:2:7.5 | 6.5 6.9 6.9 10 | 130/30 130/30 150/30 130/30 | 207 192 195 174 | 7.9 8.8 8.2 8.6 |
| 4 | 2 EG 1 PG 2 DMHT | 507 | 7:3:0 7.5:2.5:0 8:2:0 8:2:5 8:2:7.5 8:2:10 | 0 0 0 10 8.6 7.6 | 130/30 130/30 130/30 130/30 130/30 130/30 | 209 200 178 192 170 157 | 8.9 9.9 >10 >10 9.5 9.3 |
| 5 | 1.5 EG 1.5 PG 2 DMHT | 500 | 7:3:0 7:3:5 | 10 6.9 | 150/30 150/30 | 219 181 | 9.1 7.5 |

TABLE 3-continued

| Example No. | Polyester of (moles) | Average Polyester Molecular Weight | Weight Ratio Polyester : Aminoplast : TiO$_2$ | Solvent Content in Enamel (% by Wt.) | Baking Conditions (° C./min.) | Hardness Acc. to DIN 53157 (sec.) | Elasticity Acc. to DIN 53156 (mm.) |
|---|---|---|---|---|---|---|---|
| 6 | 2 EG<br>0.5 PG<br>0.5 Gly*<br>2 DMHT | 512 | 7.5:2.5:0 | 10 | 150/30 | 229 | 5.9 |
| 7 | 2.5 EG<br>0.5 PG<br>1.8 DMHT<br>0.2 AdA | 457 | 7 : 3 : 5 | 4.5 | 130/30 | 138 | 8.8 |
| 8 | 3.5 EG<br>0.5 PG<br>3 DMHT | 666 | 7.5:2.5:0<br>7.5:2.5:5 | 10<br>10 | 150/30<br>150/30 | 171<br>143 | 9.3<br>8.6 |
| 9 | 3 EG<br>1.5 PG<br>3.5 DMHT | 798 | 8 : 2 : 10 | 15 | 130/30 | 143 | 9.7 |
| 10 | 4 EG<br>1 PG<br>3.2 DMHT<br>0.48 PA<br>0.32 AdA | 803 | 8 : 2 : 5 | 10 | 130/30 | 132 | 9.7 |
| 11 | 2 EG<br>2 PG<br>1 DiEG*<br>4 DMHT | 945 | 8 : 2 : 7.5 | 10 | 130/30 | 118 | 10.0 |

*Abbreviations of Tables 1, 2, and 3
EG ethylene glycol
PG 1,2-propanediol
DiAG diethylene glycol
Gly glycerin
PA phthalic anhydride
AdA adipic acid
DMHT dimethyl hexahydroterephthalate The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid coating composition containing 0–25% solvent and a binder consisting essentially of
A. 45–10% by weight of an aminoplast, a low-molecular weight precursor thereof, or a mixture thereof; and
B. 55–90% by weight of a polyester, or mixture thereof, whose end groups are predominantly hydroxy prepared by condensing an alcohol component consisting of:
I.1 0–30 molar percent of one or more aliphatic polyols having 3 or 4 hydroxy groups and 3–6 carbon atoms, and
I.2 100–70 molar percent of a mixture of ethylene glycol and 1,2-propanediol,
with an acid component whose predominant acid is hexahydroterephthalic acid; or a binder which is the condensation product of said aminoplast component, or the starting materials for the production thereof, with said polyester component, the improvement wherein
(i) the polyester or mixture of polyesters of component (B) have a degree of condensation of between 2.5 and 10.5 and an average molecular weight of up to 1,000, and the
(ii) the mixture of ethylene glycol and 1,2-propanediol consists of 33–90 molar percent of ethylene glycol and 67–10 molar percent of 1,2-propanediol, and
(iii) the acid component mixture consists essentially of at least 80 molar percent of hexahydroterephthalic acid, one or more derivatives thereof, or a mixture thereof.

2. A coating composition of claim 1 wherein the acid component is dimethyl hexahydroterephthalate.

3. A coating compositions of claim 1 wherein the polyester component (B) has an average molecular weight of below 800.

4. A pigmented coating composition of claim 1.

5. A coating composition of claim 4 wherein the binder to pigment weight ratio is from 1 : 0.3 to 1 : 1.3.

6. A coating composition of claim 1 containing 0–15% solvent.

7. A coating composition of claim 1 wherein the acid component is a mixture of 100–90 mol-% of dimethyl hexahydroterephthalate and 0–10 mol-% of either or both of adipic acid and phthalic anhydride.

8. A coating composition of claim 1 consisting essentially of, alone or in admixture with pigment:
I. solvent: 0–15%;
II. binder: 100–85%;
  A. aminoplast: hexamethylolmelamine partially or completely etherified with a $C_1$ to $C_4$ alkanol or melamineformaldehyde-alkanol condensate;
  B. polyester: acid number: less than 10 mg. KOH/g; average molecular weight: 300 to 800;
    1. alcohol component:
      a. 100–80 mol-% of ethylene glycol (66.7 – 90 mol-%) and propylene glycol (33.3 – 10 mol-%);
      b. 0–20 mol-% of another diol or polyol;
    2. acid component:
      a. 100–90 mol-% of dimethyl hexahydroterephthalate;
      b. 0–10 mol-% of either or both of phthalic anhydride and adipic acid;
    3. molar ratio of alcohol component to acid component: $n$ moles of diol, $m$ moles of polyol and about $(n + m - 1)$ moles of acid component;
III. weight ratio of polyester component to aminoplast component: 65:35 to 85:15.

9. A coating composition of claim 8 containing pigment in a binder : pigment ratio of from 1 : 0.3 to 1 : 1.3.